Patented July 7, 1931

1,813,884

UNITED STATES PATENT OFFICE

HOMER BEHM, OF BELMAR, NEW JERSEY

TREATMENT OF MINERAL OIL MATERIAL

No Drawing. Application filed May 27, 1925, Serial No. 33,284. Renewed October 20, 1928.

The present invention relates to a process of treating mineral oil material, for the production of a product which, among other advantages, is suitable for use as a substitute for gasoline, for example in running gasoline engines, automobile engines and the like. In the following description, crude oil will be referred to as a preferred starting material, particularly crude oil from which the gasoline fraction has been removed by blowing or the like, although it will be understood that various cuts or distillates or various other mineral oil products can be employed, particularly those which are heavier and less volatile than ordinary kerosene, for example, gas-oil, fuel-oil or crude-oil which initially does not contain any substantial amount of gasoline.

In accordance with a preferred form of carrying out the invention, I place a bulk of crude oil from which the gasoline fraction has been substantially all removed by blowing with air, into a container. I then add to this, one part of "starter" to 400 parts of the oil.

The "starter" referred to may be the product produced in accordance with either of my copending applications No. 611,663 filed January 9, 1923 or No. 637,890 filed May 9, 1923 (now Patents No. 1,541,242 and 1,541,243, June 9, 1925).

A specific example of the "starter" is given, for the purpose of illustration, but it will be understood that the invention is not limited to the use of this particular starter. In the preparation of the said starter I first make a mixture of 400 volumes of ordinary kerosene, 40 volumes of slaked lime, 20 volumes of finely ground rosin, 20 volumes of strong aqua ammonia of about 28% strength, and 20 volumes of formaldehyde in the form of a commercial solution containing about 40%. All these materials are mixed together and placed in a receptacle and allowed to stand for a day or longer. In a separate vessel preferably made of glass, I mix together equal volumes of alcohol, acetone and tincture of iodine, to produce a mixture containing about 20 volumes of the same. To this mixture I add about 5 volumes of slaked-lime and 2½ volumes of ground rosin and about 2½ volumes of orange peel. This mixture, namely the second mixture, is allowed to stand for about 24 hours or longer, and I then mix together the two mixtures above referred to and let the total mixture stand for 24 hours or so, and then add to this mixture about 1 or 2% of chlorinated lime, allow to stand for another 24 hours and then the mixture is filtered or the liquid is otherwise separated from the solid. To this mixture, after being heated up to a little above atmospheric temperature (say up to 110 or 125° F.) is added a small amount, say 1%, of turpentine, and the mixture then allowed to cool.

Then to the mixture of crude oil and the starter, is then added about 5% of water, previously having had salt dissolved therein, to the extent of forming about a 4% solution, and to which has also been added a small amount, say about 1 part in 400, of tincture of iodine. There is also added to the mixture about 3% of alcohol. For this purpose ordinary denatured alcohol has been found to be entirely satisfactory.

There is then added an emulsion or mixture containing a gelatinous material, such as that produced by adding one part of the above mentioned starter to 400 parts of kerosene, adding a little water and alcohol and blowing for several hours or preferably several days with air, and during this blowing operation there may be added from time to time, two or three percent or so of water, various salts, particularly those having an oxidizing nature such as sodium nitrate, phosphate, alcohol and the like. The process of treating the said kerosene with the starter and aerating and treating the same is not claimed in the present application, but in my copending applications No. 575,040 filed July 14, 1922 and No. 637,889 filed May 9, 1923.

It will be understood that in place of adding the gelatinous material formed in accordance with the said two prior applications, the same material formed in any other appropriate manner can be employed.

The mixture is then aerated thoroughly, and in actual practice I have found that aeration for a period of 48 hours or longer is most satisfactory, although it will be understood that the aeration can be continued for a shorter period. In some experiments I have aerated for a period of 48 hours, namely twelve hours each day for four successive days, allowing the mixture to stand without treatment during the night. In a particular experiment in which four twelve hour periods of aeration, during the day time was employed, I added after the first day's aeration, about two thirds of a percent of light aluminum hydrate, mixed with an equal amount of water and half as much boric acid. The material "aluminum hydrate light" is a material which can readily be mixed with water or with a mixture of boric acid and water to form suspensions therein, and is sold by Warner Chemical Company of New York.

In this particular experiment, aluminum hydrate light was employed, but in other experiments ordinary aluminum hydroxide has been used with satisfactory results. Thus it is seen that aluminum hydrate light and aluminum hydrate heavy, as the terms are used in commercial practice, are to some extent the equivalent of each other, but I have preferred the use of aluminum hydrate light, as being more satisfactory, in the carrying out of this process.

In the experiment above referred to, on the following day, after a further aeration of twelve hours, I added about one tenth percent of barium peroxide treated with one tenth percent of dilute phosphoric acid. In other experiments of a similar nature I have used commercial hydrogen peroxide instead of this mixture, but the mixture seems to be in some respects better. In other cases I have used commercial hydrogen peroxide with a small amount of phosphoric acid or a phosphate added, with satisfactory results. In other experiments phosphoric acid has been added without hydrogen peroxide, and if this amount of phosphoric acid is found to render the entire mixture slightly acid, a little aqua ammonia should be added in order to bring the mixture over onto the alkaline side.

After the addition of the hydrogen peroxide or equivalent material, it is advisable to again aerate for twelve hours or longer.

I call attention at this stage to the fact that from the beginning, it is advisable that the oil under treatment or oil and water mixture under treatment be either neutral or slightly alkaline from the commencement of the process. Even a considerable excess of alkali does not appear to do any harm. Should the mixture at the beginning of the aeration treatment be found to be slightly acid, a little ammonia or other alkali can be added, at least enough being used to bring the same to a neutral condition.

At this stage the entire mixture can be made acid, by the use of various acids. Acetic acid has been found to be very satisfactory for this purpose, although other acids such as phosphoric, nitric, hydrochloric or sulphuric, or mixtures of such acids can be used.

The degree of acidity of the mixture at this stage does not seem to have any important effect in the final results. The rendering of the material slightly acid seems to cause the mass to stiffen somewhat, while causing some of the water insoluble salts or precipitate in the bottom to dissolve up.

The oil at this stage may be heated if desired, say to a temperature of about 150° F., although this degree of temperature may vary considerably. After the heating operation, and either before or after the subsequent cooling, lime is added in such amount as to render the mass slightly alkaline in reaction. The material is then further aerated, say for another twelve hours, and after the aeration can be allowed to settle and the oil decanted off from the aqueous sludge remaining in the bottom.

To the oil is then preferably added a small amount, say about half a percent of benzol. Preferably a pure benzol is used for this purpose. There is also added if desired, alcohol for example denatured alcohol which may be added to the extent of 10%. The amount of alcohol can vary considerably from this figure, and both the alcohol and the benzol have in some instances been omitted, while still producing satisfactory results.

The material is then subjected to pressure, preferably by subjecting to direct steam pressure at 100 pounds or more. This operation can be conducted by the use of a steam chest or equivalent. The pressure treatment is found to very considerably lower the boiling point, both the initial boiling point and the end boiling point of the mixture. The product or mixture produced in this specific example, in which the aeration was continued for 48 hours and a steam pressure of one hundred pounds used in the final step, was found to be of a gravity of about 26° Bé., was found to have an initial boiling point of about 212° F. and an end boiling point of 350° F. In other cases I have used considerably higher pressures in the final stage of the operation, giving a further reduction in the end boiling point, for example with 150 pounds pressure of steam in the final step, an end boiling point material of 310° F. was produced, whereas with only 75 pounds steam pressure the end boiling point was found to be 360° F.

The products as produced can then be blended with casing head gasoline or other light gasoline, to bring the gravity to about 46 to 48 Bé., and the treated product is found to be an excellent motor fuel.

In carrying out many tests, under various conditions, I found that in some cases the starter referred to in the first step of the process could be omitted.

Experiments indicated that the common salt used in the first aqueous material added, as well as the tincture of iodine used therein could both be omitted. In other cases various other salts have been found to be useable in this connection, in place of sodium chloride, for example sodium nitrate. In place of using denatured alcohol, grain alcohol can also be used.

In some experiments I have conducted, I have found it very advisable to acidify the mixture at any stage of the operation, with a little phosphoric acid, say of 50% strength, sufficient to render the mixture somewhat acid, followed by the addition of sufficient ammonia water to cause the same to become alkaline. Other acids or alkalies can be used in a similar manner. In various tests which I have made, the gravity of the oil does not change very substantially during the process. In many of the tests, the gravity of the finished product has been one or two degrees heavier than the gravity of the starting material.

In blowing the air through the oil at the commencement of the operation or before the operation, to remove the gasoline, it is advisable to lead the exit air through a suitable absorption apparatus in order to recover the gasoline driven off. All of the air used in the aerate treatments can likewise be passed through as absorber if desired. The material recovered in the absorber can be used for dilution of the final product in order to bring down the specific gravity or bring up the Bé gravity.

The treatment with steam in the final step has the result of introducing a certain amount of water into the oil, which water does not separate out readily, on account of its finely divided condition. This steam treatment is also reduces the amount of color, giving a lighter colored product than that existing before the treatment.

In some stages it is advisable, where the same is readily obtainable, to use crude oil containing a considerable amount of water emulsion. Such crudes are not only cheaper to purchase, but are more valuable for treatment in accordance with the present process, the emulsified water apparently acting during the process.

During the treatment, it will be found that the oil has become very smooth in appearance. The odor will be found to have become very considerably changed, and it (the treated oil) has a soft and smooth feeling to the touch.

I claim:—

1. A process of treating mineral oil material which comprises mixing a mineral oil material consisting largely of fractions less readily volatile than gasoline, with a small proportion of a "starter," adding aqueous material and alcohol in amount equal to a few percent of the volume of the oil, adding an aqueous emulsion containing material of a gelatinous nature having the properties of the gelatinous material formed by aerating a mineral oil material, water, alcohol and a small amount of said "starter", aerating the mixture for a period of at least several hours, and adding successively during such aeration period small percentages of aluminum compounds and a phosphate and peroxide mixture, thereafter rendering the material acid in reaction, heating to above the normal temperature of the living human body, making somewhat alkaline, aerating and finally treating with steam under pressure, the "starter" above mentioned containing the reaction products of lime, rosin, ammonia, and formaldehyde, and a large amount of mineral oil material.

2. In the treatment of mineral oil material, containing fractions less volatile than gasoline as its major constituents, the steps of adding thereto a "starter" and a mixture containing a gelatinous material having the properties of the gelatinous material obtained by protracted aeration of mineral oil material, "starter" and aqueous material, said "starter" in both instances being produced by treating mineral oil material with slaked lime, rosin, ammonia and formaldehyde and thereafter subjecting the whole mixture to protracted aeration in the presence of a few percent of water and alcohol.

3. The application of the entire process of claim 2, to crude petroleum from which the bulk of the gasoline fraction has been removed.

4. In the treatment of mineral oil material, the step of adding a "starter" made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

5. A process of treating mineral oil material which comprises mixing a mineral oil material consisting largely of fractions less volatile than gasoline, with aqueous material and alcohol in amount equal to a few percent of the volume of the oil, adding an aqueous emulsion containing gelatinous material of the nature of that formed by aerating a mineral oil material, water, alcohol and "starter", aerating the mixture during at least several hours, rendering the material acid in reaction, heating to above normal human body temperature, rendering the material alkaline, and finally subjecting the material to pressure, said "starter" being made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

6. A process of treating mineral oil material which comprises mixing a mineral oil material consisting largely of fractions less volatile than gasoline, with aqueous material and alcohol in amount equal to a few percent of the volume of the oil, adding an aqueous emulsion containing gelatinous material of the nature of that formed by aerating a mineral oil material, water, alcohol and "starter", aerating the mixture during at least several hours, adding aqueous materials at several stages during the said treatment, rendering the material acid in reaction, heating to above normal human body temperature, rendering the material alkaline, and finally subjecting the material to pressure, said "starter" being made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

7. A process of treating petroleum oil consisting essentially of material less volatile than gasoline which comprises the steps of aerating in the presence of a "starter" made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine and an aqueous emulsion containing gelatinous material having the properties of the gelatinous material formed by aerating a mineral oil material, water, alcohol and a small amount of said "starter", and aqueous material, and thereafter subjecting the same to direct steam pressure.

8. A process of treating mineral oil material which comprises mixing a mineral oil material consisting largely of fractions less volatile than gasoline, with aqueous material and alcohol in amount equal to a few percent of the volume of the oil, adding an aqueous emulsion containing gelatinous material of the nature of that formed by aerating a mineral oil material, water, alcohol and "starter" aerating the mixture during at least several hours, adding during the said treatment, a substance containing an agent of an oxidizing character, rendering the material acid in reaction, heating to above normal human body temperature, rendering the material alkaline, and finally subjecting the material to pressure, said "starter" being made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

9. A process of treating mineral oil material which comprises mixing a mineral oil material consisting largely of fractions less volatile than gasoline, with aqueous material and alcohol in amount equal to a few percent of the volume of the oil, adding an aqueous emulsion containing gelatinous material of the nature of that formed by aerating a mineral oil material, water, alcohol and "starter", aerating the mixture during at least several hours, adding during such treatment, an aluminum compound and an agent of an oxidizing character, rendering the material acid in reaction, heating to above normal body temperature, rendering the material alkaline, and finally subjecting the material to pressure, said starter being made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

10. The application of the entire process of claim 2, to a mineral oil material consisting largely of components less volatile than kerosene, and in which gasoline is substantially absent.

11. A process of treating petroleum oil consisting essentially of material less volatile than gasoline which comprises the steps of aerating in the presence of an aqueous emulsion containing gelatinous material having the properties of the gelatinous material formed by aerating a mineral oil material, water, alcohol and a small amount of said "starter", and aqueous material, and thereafter subjecting the same to direct pressure.

12. A process of treating mineral oil material which comprises mixing a mineral oil material consisting largely of fractions less volatile than gasoline, with aqueous material and alcohol in amount equal to a few percent of the volume of the oil, adding an aqueous emulsion containing gelatinous material of the nature of that formed by aerating a mineral oil material, water, alcohol and "starter", aerating the mixture during at least several hours, adding an aluminum compound before the end of the aeration process, rendering the material acid in reaction heating to above normal human body temperature, rendering the material alkaline, and finally subjecting the material to pressure, said starter being made by first mixing a large bulk of mineral oil material with smaller quantities of slaked lime, rosin, aqua ammonia, and formaldehyde and allowing to stand for several hours, also mixing separately therefrom alcohol, acetone, tincture of iodine and orange peel allowing this mixture to stand for several hours, mixing such two mixtures with each other, adding thereto chlorinated lime, separating the bulk of the insoluble matter and adding turpentine.

In testimony whereof I affix my signature.

HOMER BEHM.